(12) United States Patent
Guenthner et al.

(10) Patent No.: US 10,488,854 B1
(45) Date of Patent: Nov. 26, 2019

(54) METHOD AND DETERMINATION FOR FUGITIVE EMISSIONS MONITORING TIME

(71) Applicant: InspectionLogic Corporation, Louisville, KY (US)

(72) Inventors: William Guenthner, Sheperdsville, KY (US); Chris Patterson, Burley, ID (US)

(73) Assignee: INSPECTIONLOGIC CORPORATION, Louisville, KY (US)

( * ) Notice: Subject to any disclaimer, the term of this patent is extended or adjusted under 35 U.S.C. 154(b) by 1100 days.

(21) Appl. No.: 14/717,663

(22) Filed: May 20, 2015

Related U.S. Application Data

(60) Provisional application No. 62/001,005, filed on May 20, 2014.

(51) Int. Cl.
*G05B 23/00* (2006.01)
*G05B 1/11* (2006.01)

(52) U.S. Cl.
CPC ............. *G05B 23/00* (2013.01); *G05B 1/11* (2013.01)

(58) Field of Classification Search
CPC ....... G01M 3/04; G01N 1/2205; G06B 23/00; G05B 1/11
USPC ............................................ 422/83; 235/375
See application file for complete search history.

(56) References Cited

U.S. PATENT DOCUMENTS

| | | | |
|---|---|---|---|
| 3,853,455 A | 12/1974 | Riordan et al. | |
| 3,985,509 A | 10/1976 | Trone et al. | |
| 4,346,055 A | 8/1982 | Murphy et al. | |
| 4,603,235 A | 7/1986 | Crabbe, Jr. | |
| H572 H | 2/1989 | Hansen | |
| 5,099,437 A * | 3/1992 | Weber | G01M 3/04 235/375 |
| 5,206,818 A | 4/1993 | Speranza | |
| 5,356,594 A | 10/1994 | Neel et al. | |
| 5,432,095 A | 7/1995 | Forsberg | |
| 5,479,359 A | 12/1995 | Rogero et al. | |
| 5,563,335 A | 10/1996 | Howard | |
| 6,341,287 B1 | 1/2002 | Sziklai et al. | |
| 6,345,234 B1 | 2/2002 | Dilger et al. | |
| 6,438,535 B1 | 8/2002 | Benjamin et al. | |
| 6,478,849 B1 | 11/2002 | Taylor et al. | |
| 6,545,278 B1 | 4/2003 | Mottier et al. | |
| 6,549,916 B1 | 4/2003 | Sedlar | |
| 6,609,090 B1 | 8/2003 | Hickman et al. | |
| 6,672,129 B1 | 1/2004 | Frederickson et al. | |
| 6,680,778 B2 | 1/2004 | Hinnrichs et al. | |
| 6,722,185 B2 | 4/2004 | Lawson et al. | |

(Continued)

FOREIGN PATENT DOCUMENTS

WO      2006022648      3/2006

OTHER PUBLICATIONS

Part V Environmental Protection Agency, pp. 1-25, Jan. 5, 1981.*

(Continued)

*Primary Examiner* — Regis J Betsch
*Assistant Examiner* — Kaleria Knox
(74) *Attorney, Agent, or Firm* — Middleton Reutlinger

(57) ABSTRACT

A system and method is provided for inspecting and recording leak detection and repair components. The method and systems provide a visual representation of the inspection data and provide feedback to the operator to indicate the location of a maximum reading so that the location of the maximum reading may be properly interrogated for a predetermined response time multiple.

33 Claims, 8 Drawing Sheets

(56) References Cited

U.S. PATENT DOCUMENTS

| | | | |
|---|---|---|---|
| 6,771,744 | B1 | 8/2004 | Smith et al. |
| 7,017,386 | B2 | 3/2006 | Liu et al. |
| 7,089,530 | B1 | 8/2006 | Dardinski et al. |
| 7,103,610 | B2 | 9/2006 | Johnson et al. |
| 7,136,904 | B2 | 11/2006 | Bartek et al. |
| 7,298,279 | B1 | 11/2007 | Badon et al. |
| 7,330,768 | B2 | 2/2008 | Scott et al. |
| 7,356,703 | B2 | 4/2008 | Chebolu et al. |
| 7,369,945 | B2 | 5/2008 | Miller et al. |
| 7,437,362 | B1 | 10/2008 | Ben-Natan |
| 7,482,973 | B2 | 1/2009 | Tucker et al. |
| 7,588,726 | B1 * | 9/2009 | Mouradian ......... G01N 1/2205 422/83 |
| 7,657,384 | B1 | 2/2010 | Moses |
| 7,840,366 | B1 | 11/2010 | Moses et al. |
| 7,851,758 | B1 | 12/2010 | Scanlon et al. |
| 8,193,496 | B2 | 6/2012 | Furry |
| 8,386,164 | B1 | 2/2013 | Moses |
| 2002/0026339 | A1 | 2/2002 | Frankland et al. |
| 2002/0080032 | A1 | 6/2002 | Smith et al. |
| 2002/0094498 | A1 | 7/2002 | Rodriguez-Rodriguez et al. |
| 2002/0178789 | A1 | 12/2002 | Sunshine et al. |
| 2003/0012696 | A1 | 1/2003 | Millancourt |
| 2003/0081214 | A1 | 5/2003 | Mestha et al. |
| 2003/0085714 | A1 | 5/2003 | Keyes et al. |
| 2003/0217101 | A1 | 11/2003 | Sinn |
| 2004/0005715 | A1 | 1/2004 | Schabron et al. |
| 2004/0011421 | A1 | 1/2004 | Bartlett et al. |
| 2004/0059539 | A1 | 3/2004 | Otsuke et al. |
| 2004/0204915 | A1 | 10/2004 | Steinthal et al. |
| 2004/0226345 | A1 | 11/2004 | McCoy et al. |
| 2004/0258213 | A1 | 12/2004 | Beamon et al. |
| 2005/0000981 | A1 | 1/2005 | Peng et al. |
| 2005/0005167 | A1 | 1/2005 | Kelly et al. |
| 2005/0053104 | A1 | 3/2005 | Kulp et al. |
| 2005/0060392 | A1 | 3/2005 | Goring et al. |
| 2005/0117641 | A1 | 6/2005 | Xu et al. |
| 2005/0234934 | A1 | 10/2005 | Mackay et al. |
| 2005/0246112 | A1 | 11/2005 | Abhulimen et al. |
| 2005/0262995 | A1 | 12/2005 | Kilkis |
| 2005/0275556 | A1 | 12/2005 | Brown |
| 2005/0286927 | A1 | 12/2005 | Brenner |
| 2006/0020186 | A1 | 1/2006 | Brister et al. |
| 2006/0220888 | A1 | 10/2006 | Germouni et al. |
| 2006/0235611 | A1 | 10/2006 | Deaton et al. |
| 2006/0246592 | A1 | 11/2006 | Hashmonay |
| 2006/0286945 | A1 | 12/2006 | Reznik et al. |
| 2007/0000310 | A1 | 1/2007 | Yamartino et al. |
| 2007/0004381 | A1 | 1/2007 | Larson et al. |
| 2007/0074035 | A1 | 3/2007 | Scanlon et al. |
| 2007/0139183 | A1 | 6/2007 | Kates |
| 2007/0299953 | A1 | 12/2007 | Walker et al. |
| 2008/0021717 | A1 | 1/2008 | Kaartinen et al. |
| 2008/0063298 | A1 | 3/2008 | Zhou et al. |
| 2008/0092625 | A1 | 4/2008 | Hinnrichs |
| 2008/0120043 | A1 | 5/2008 | Miller et al. |
| 2008/0231719 | A1 | 9/2008 | Benson et al. |

OTHER PUBLICATIONS

USPTO Allowance (dated Jun. 8, 2011), Response to Office Action (dated Mar. 21, 2011), Office Action (dated Dec. 21, 2010), RCE (dated Sep. 27, 2010), Advisory Action (dated Sep. 10, 2010); U.S. Appl. No. 11/668,367 (Skiba, et al.).

Response/Amendmnet After Final (dated Aug. 24, 2010), Final Office Action (dated Jun. 25, 2010), Response to Office Action (dated Apr. 26, 2010), Office Action (dated Jan. 25, 2010); U.S. Appl. No. 11/668,367 (skiba, et al).

Response to Office Action (dated Aug. 29, 2011), USPTO Office Action (dated May 27, 2011); U.S. Appl. No. 12/474,504 (Bolinger, et al).

Response to Office Action (dated Feb. 21, 2012) and USPTO Office Action (dated Nov. 18, 2011); U.S. Appl. No. 12/359,196 (Moses, et al).

Office Action Response (dated Jul. 13, 2010), Office Action (dated Apr. 14, 2010), Response After Final (dated Mar. 26, 2010), Final Office Action (dated Jan. 29, 2010), Office Action Response (dated Nov. 4, 2009), Office Action (dated Aug. 4, 2009); U.S. Appl. No. 12/032,499 (Moses et al).

Foxboro Company; TVA-1000B Toxic Vapor Analyzer Operation, Configuration, and Maintenance; Manual; Jun. 1996; USA.

Pursuit Global Solutions; LeakTracker M.A.R.S.; User Guide; Mar. 2000; USA.

Federal Register; Environmental Protection Agency—Part V; vol. 46, No. 2; Jan. 1981; USA.

California Air Pollution Control Officers Association; California Implementation Guidelines for Estimating Mass Emissions of Fugitive Hydrocarbon Leaks at Petroleum Facilities; Feb. 1999; USA.

Juniper Systems, Inc.; Introducing the Allegro CX(TM) Filed Computer; Product News: Computer Hardware & Peripherals; Jun. 21, 2004; USA.

Accutech Div., Adaptive Instruments Inc.; New from Accutech, Wireless Acoustic Monitor Filed Units make Fugitive Emissions Monitoring compliance Easy; Product New: Sensors, Monitors & Transducers; 2004; USA.

\* cited by examiner

| 07 | 15 | 15 | 10 |
|:---:|:---:|:---:|:---:|
| INSPECTION VALUE | ELAPSED INSPECTION TIME | REMAINING INSPECTION TIME | MAXIMUM INSPECTION VALUE |

FIG. 10

METHOD AND DETERMINATION FOR FUGITIVE EMISSIONS MONITORING TIME

BACKGROUND

A leak detection and repair (LDAR) system and method for components and display of the inspection data on a video representation device may be utilized to aid in capturing accurate inspection data. For example, a hand-held device which has a video representation device may obtain detection data readings from an LDAR inspection device and display such data in a form which readily enables an operator to follow required LDAR inspection protocols. As one example, the video representation device may include a display which continually charts along a line graph the PPM reading from the LDAR inspection device over time and indicating to the operator exactly when inspection requirements are met through a visual representation on the graph as the data is being read and displayed.

SUMMARY

This specification is directed generally to a method for inspecting and recording inspection data of a leak detection and repair components on a visual representation device. More particularly, the description included herewith and the claims set forth generally describe a method for displaying on a visual representation device the detected data from an LDAR component inspection device so that the operator may readily determine when increased readings occur and the affect such increased readings have on total inspection time for the component. This total inspection time may vary from component to component and, during a particular inspection, may be increased if the incremental inspection data read by the inspection device exceeds a detection data comparator. Upon determination of exceeding such detection data comparator, the visual representation device may increase the component inspection time while the read data continually increases. The visual representation device will indicate on a display graph the increased component inspection time as the incremental inspection data for the component continues to increase in value. Once the inspection data levels off or decreases, the increased component inspection time, as represented on the visual representation device, will be maintained in a fixed position while the elapsed inspection time representation continues forward toward such increased component inspection time. Once the elapsed inspection time value exceeds the increased component inspection time value as represented on the visual display device after determination of such maximum incremental inspection data, the operator has met requirements for properly inspecting the LDAR component.

In various implementations, the minimum differential between the maximum read incremental inspection data and the increased component inspection time value is a predetermined response time multiple. Such predetermined response time multiple allows proper interrogation at the maximum point of incremental inspection data for the leak point and the visual representation device indicates to the operator where such maximum inspection point has occurred. Further, the visual representation device properly calculates the total required component inspection time under various circumstances to ensure that an increased component inspection time is utilized where required.

In some implementations, a line graph is displayed on the visual representation device graphing detected concentrations over an inspection time period. Alternatively, in various embodiments, the visual representation device may display numeric values for such data.

In various implementations, the determination of the incremental inspection data read by the LDAR inspection device exceeding the detection data comparator is a determination that the concentration read by the inspection device is higher than a background level. Such triggering of the incremental inspection data exceeding the detection data comparator causes the component inspection time to be incrementally increased as long as the incremental inspection data of the component represents an increasing value. Thus, while the inspection data from the inspection device is increasing, the component inspection time is increased allowing the operator time to locate the maximum leak point so that she may inspect at such point a minimum of a predetermined response time multiple.

In various embodiments or implementations, the visual representation device will display such increased component inspection time as a cumulative time advancing ahead of the elapsed inspection time on the graph so that the operator may readily determine not only remaining inspection time but also data trends as the inspection continues.

The method and other implementations set forth herein may each optionally include various other of the stated features.

In some implementations, the read data from the LDAR inspection device includes a plurality of incremental inspection data for the LDAR component which are displayed on a visual graph. The visual graph plots both concentrations of material versus time on a graph depicted on the visual representation device.

In other embodiments, the visual representation device may display the plurality of incremental inspection data for the component as compared to the elapsed inspection time value. As well, the system and method may further include displaying the increased component inspection time in addition to the elapsed inspection time value. Further, the increased component inspection time, the elapsed inspection time, and the plurality of incremental inspection time for the component may all be displayed on the visual graph displayed on the visual representation device.

In various embodiments, the visual representation device may display such data on a visual graph. Alternatively, the visual representation device may simply provide numerical values, charts, colors or other symbols indicative of said data.

Alternatively, in various embodiments, the detection data comparator may be a component specific data value.

According to some implementations, the method may increase the component inspection time by a predetermined response time multiple which is added to the component inspection time in order to properly calculate the increased component inspection time. In various embodiments, such predetermined response time multiple may be related to the LDAR component inspection device. In still further embodiments and implementations, the predetermined response time multiple may be directly related to the predetermined and calculated response time for the LDAR component inspection device.

In some implementations, the elapsed inspection time value is a value in time incremental seconds.

As well, in further implementations, the method and systems disclosed herein may record at a plurality of time intervals the incremental inspection data for the component and may further record an associated time entry for each of the plurality of incremental inspection data. As well, and in further embodiments, the associated time entry may be the elapsed inspection time value for the initiated inspection of the component.

In still further embodiments, the method and systems set forth herein may include representing on the visual representation device and on the visual graph a visual marker at a maximum incremental inspection data for the component clearly indicating the maximum read incremental inspection data for the inspected component.

In still further embodiments and implementations, the visual representation device may further represent on the graph the component inspection time.

In some implementations, the visual representation device and the associated visual representation device may be remote from the LDAR component inspection device and may include various communication protocols and devices to communicate with the LDAR component inspection device. Alternatively, in various other embodiments, such device may be directly connected to the LDAR component inspection device.

In some implementations, the visual representation device may be associated with and/or a part of a storage system in order to maintain a database of incremental inspection data and other associated values.

In other implementations, the visual representation device may include memory and a processor to execute instructions required to implement such systems and methods.

In various implementations, the visual representation device is associated with and/or a part of a hand-held or other computing device which may include a remote connection to a remote server, the remote server maintaining a master inspection database which is updated with data from a mobile database associated with the visual representation device.

In various implementations, the visual graph may be a line graph. Alternatively, in various implementations, the visual graph may be alternative representations of the data and information could be readily perceived by the operator.

In some implementations, the line graph may include a linear moving representation over time of the incremental inspection data for the component.

In various implementations, the line graph which is displayed on the visual representation device may include a first representation of a maximum value of the plurality of incremental inspection data. In alternative embodiments, the line graph may include a second representation of the increased component inspection time on the line graph. In alternative embodiments and implementations, the first representation and the second representation are maintained at least a predetermined distance apart on the visual graph, such predetermined distance apart being at least a predetermined time period related to the inspection device which is in communication with the video representation device.

In various implementations, the elapsed inspection time value and the increased component inspection time value are on a visual graph. Alternatively, in other implementations, the elapsed inspection time value and the increased component inspection time are displayed as numerical representations.

In some implementations, the component inspection time is initially a predefined value related to the LDAR component. In some implementations, the visual representation device may be associated with a hand-held computing device and in other implementations, the visual representation device may be an integrated computing device. Other implementations may include a non-transitory computer-readable storage medium storing instructions executable by a processor to perform a method such as one or more of the methods described above. Further implementations may include systems which include a memory and one or more processors operable to execute instructions stored in the memory to perform a method such as one or more of the methods described herein.

It should be further appreciated that all of the foregoing concepts and additional concepts described in further detail are contemplated as being part of the subject matter disclosed herein. For example, all combinations of claimed subject matter appearing at the end of this disclosure are contemplated as being part of the subject matter disclosed and are incorporated herewith.

BRIEF DESCRIPTION OF THE DRAWINGS

FIG. 10 illustrates an alternative display on the visual representation device.

DETAILED DESCRIPTION

Figure 1:
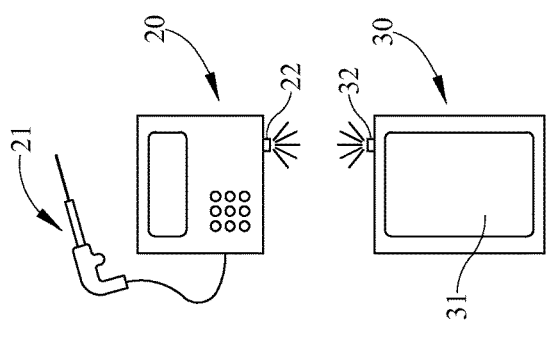
FIG. 1 illustrates a leak detection and repair (LDAR) inspection device with an associated visual representation device of the various embodiments.
Figure 2:
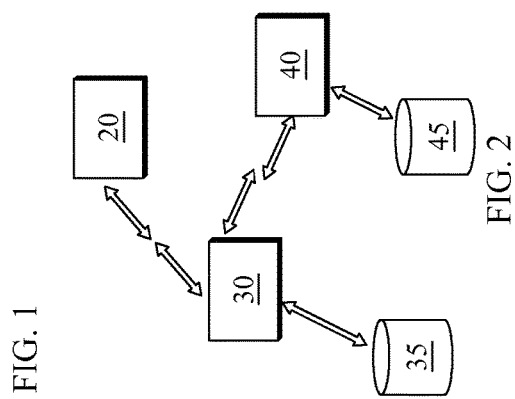
FIG. 2 illustrates a representation of exemplary architecture for the inspection device and associated storage and data bases of the various embodiments.

FIG. 1 illustrates an example of a leak detection and repair (LDAR) component inspection device which may include an inspection probe 21 and a toxic vapor analyzer (TVA) 20. Such LDAR inspection devices are well known in the art and include, for example, the TVA-1000B toxic vapor analyzer manufactured by Thermo Environmental Instruments Inc.

The TVA 20 is utilized in order to inspect leak detection and repair components. The probe 21 is utilized to collect vapor samples and the TVA combusts such samples and provides data values of such samples, typically in a PPM format. The incremental inspection data determined by the TVA 20 may be transmitted along a communication channel 22, which may be wired or wireless.

Associated with the TVA 20 may be a visual representation device 30 which has a communication channel 32 and a display screen 31. The visual representation device may include a computing device, be associated with a computing device, and include a processor, memory, and storage. As well, the visual representation device may include instructions stored in memory to implement the various methods and systems set forth herein. The visual representation device may be a separate component associated with a computing device and/or system or associated with the TVA. For example the device may be a touch pad type device, an ocular display device for the operator, a hand-held display device and/or associated display electronics which communicates with a computing device. Alternatively, all electronics may be associated and combined in the visual representation device.

As is set forth herein and as is described in the various embodiments, the visual representation device may include a screen 31 and be associated with a mobile data base and storage unit 35. The TVA may communicate through a communication channel 22 to a communication channel 32 of the visual representation device 30. The mobile data base or storage unit 35 may be integrated directly with the visual representation device which, as indicated herein, in various embodiments, may also be integrated with a mobile computing device. As well, the further embodiments may combine a server 40 having a permanent storage device 45 for storage of the data obtained during the inspection methodology set forth. The visual representation device 30 may be in direct communication via the communication channel to both the TVA 20 and to the server 40.

FIG. 3-9 illustrate various representations on the display of data and method for inspecting and recording inspection data for an LDAR component on a visual representation device. Such information and data may be displayed in multiple formats and the variant graphs disclosed herein are provided for exemplary purposes only and in no way are considered to be limiting. Further, the same data may be displayed in bar charts, pie charts, simple numerical representations, or in any other format which would convey to the operator of the TVA the same or comparable information as set forth herein.

Figure 3:
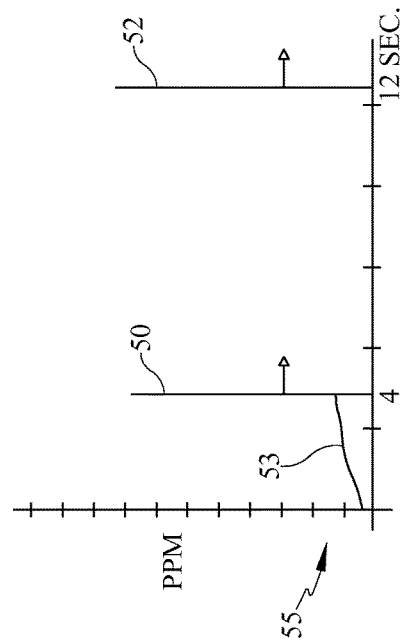
FIG. 3 illustrates a representation of one embodiment for implementing the methods and systems described herein wherein an inspection of a component has just been initiated.

As shown in FIG. 3, an exemplary line graph is depicted wherein a first vertical axis discloses PPM (parts per million) values and the horizontal axis is related to inspection time. As shown, the line graph depicted may be displayed on the visual representation device 30 on any visual device available to the operator.

With inspection of an LDAR component, a component inspection time may be defined and may be related to the particular component characteristics being inspected by the operator using the TVA and the visual representation device 30.

Utilization of a graph or visual representation of the incremental inspection data for view by the inspector/operator ensures compliance with appropriate regulatory requirements for inspection of VOC emissions. Routine monitoring of LDAR components is required and heavily regulated. In such LDAR component interrogation, inspections for leaks are designed to take place to ensure VOC emissions are kept to a minimum and at the location where leaks are detected, appropriate repairs are undertaken. Such inspections require the TVA probe 21 to be placed at the surface of the component interface where leakage may occur. The probe 21 is moved along the interface periphery while observing the readout from the TVA 20. Such readout may also be displayed on the visual representation device 30 as depicted in the various examples. When an increased meter reading is observed, the interface must be slowly sampled where a leak may be indicated until the maximum meter reading is obtained. The probe must be left at such maximum reading location for approximately two times the TVA instrument 20 response time. If the maximum observed meter reading is greater than the leak definition for the particular LDAR component, the determination of such leak must be reported and recorded.

Utilizing the method for inspecting and recording inspection of LDAR components as set forth herein ensures that the operator maintains appropriate interrogation of the component interface where the leakage may occur by providing real time feedback to the operator and visual indication as to the maximum PPM reading and the location thereof. As well, the system and method continually moves the increased component inspection time visual representation 52 as needed.

Namely and for example, upon initiation of an inspection for an LDAR component, the operator utilizes the visual representation device 30 with the LDAR inspection tool 20/21 to begin inspection. The visual representation device, knowing the particular LDAR component ID associated with the inspection by lookup, storage, database or other means, will indicate the appropriate component inspection time required for the component ID 1001. Incremental inspection data is then received 1002 after initiation of the inspection from the TVA 20 by virtue of placement of the probe 21 at the appropriate position and component interface which then transmits the incremental inspection data determined by the TVA 20 to the visual representation device 30.

Figure 4:
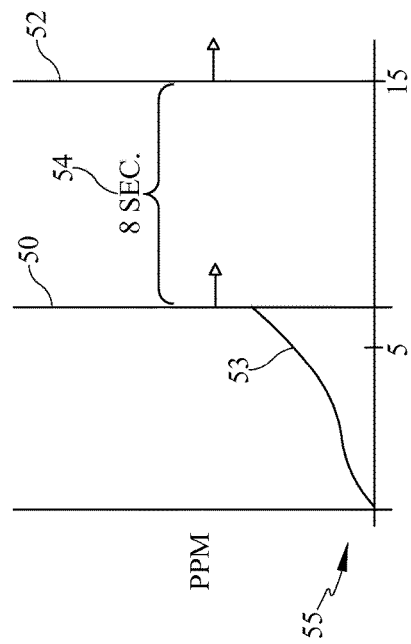
FIG. 4 illustrates a further embodiment and representation wherein an inspection of a component results in incremental inspection data of increasing values thereby increasing the component inspection time.

Upon receipt of the incremental inspection data, the visual representation device will display an incremental inspection data line 53 in a graph, for example, as depicted in this embodiment. Other display embodiments may readily be used. The incremental inspection data line 53 represents the incremental inspection data for the component over the component inspection time. As the time progresses, the most recent or current time reading for the incremental inspection data is visually represented as a line 50 progressing forward along the time axis on the graph 55. Such visual feedback to the operator ensures that the operator not only is aware of the required component inspection time necessary for completion of an appropriate inspection represented as line 52 in FIG. 3, but is also made aware of the potentially increased component inspection time when increasing component inspection readings are detected in the incremental inspection data as represented in FIG. 4.

Namely, as the visual representation device receives the incremental inspection data through the communication channel 32, any value which exceeds a detection data comparator requires that the operator closely interrogate the area where such increased data values occurs. Such increase in the incremental inspection data may be detected by comparing the incremental inspection data read from the TVA and transmitted to the visual representation device to a detection data comparator 1003, the data comparator being a value representative of a reading higher than the background reading which would indicate the potential of a leak or increased VOCs. The detection data comparator may be previously defined for the particular TVA or inspection device, may be defined as related to background readings or may be defined with respect to location parameters. Various embodiments and implementations for a detection data comparator may be utilized which would indicate a reading by the TVA higher than the standard expected non-leaking component reading and indicating that a potential leak or higher concentration of VOCs has been detected.

Upon determination that the incremental inspection data exceeds a defined detection data comparator, visual representation to the operator of the increase or incremental inspection data may be provided along a line 53 of the representation graph 55. In various embodiments, the most recent or current time position for the incremental inspection data may be displayed as a representation 50 as the inspection continues. A secondary visual representation 52 may also be displayed indicating at least the initial component inspection time. The component inspection time as related to the visual representation 52 on graph 55 may initially be represented on the time graph 55 the end of the inspection time period. However, the required component inspection time period for proper inspection of the LDAR component may be increased as a result of the incremental inspection data being greater than the detection data comparator.

Namely, and for exemplary purposes only, an LDAR component may have an initial component inspection time of eight seconds 1001. If, under a typical inspection, no increased value is detected as comparing the incremental inspection data received from the TVA at the visual representation device to the detection data comparator, the component inspection time visual representation 52 will remain at a point representative of eight seconds from initiation of the inspection as displayed on the visual graph 55. However, as the inspection continues and the incremental inspection data progresses towards the component inspection time 52, a reading value for the incremental inspection data may be detected which is greater than the detection data comparator. Such detection will automatically require that the visual representation device recalculate and increase the component inspection time representation 52 while the operator locates the maximum concentration location and in order to interrogate the suspected leak location for a required multiple of the TVA response time. Such recalculation may also be needed since the difference between the elapsed time of the inspection and the total component inspection time may be less than a requirement for inspection of a potential leak point. Thus, an elapsed inspection time value is maintained for the entire LDAR component inspection and, for regulatory requirements, an inspection of two times the instrument response time must be conducted at the interface where leakage is indicated, namely, the maximum meter reading location. Thus, merely increasing the component inspection time upon reading of an incremental inspection data point higher than the detection data comparator is insufficient. The component inspection time must be continually increased until the maximum reading point and location of the component is determined.

Continuing on the example of the noted embodiment and implementation, if the component inspection time has an eight second duration and, for example, the elapsed inspection time value is four seconds at the point that an increased incremental inspection data is detected, the visual representation device will determine that the visual representation for an increased component inspection time 52 must be repositioned to allow for continued inspection for at least the value of a predetermined response time multiplier. In the present example depicted in FIG. 3, if the initial component inspection time was eight seconds and the incremental inspection data were detected to be greater than a detection data comparator at four seconds elapsed inspection time and where the predetermined response time multiplier is eight seconds (for example two times the minimum response time of the component inspection device), an eight second differential representative of the predetermined response time multiplier must be maintained as gap 54 in the display graph 55. Such multiplier can be any value and is simply provided to ensure accurate readings. The visual representation device will automatically recalculate and reposition the increased component inspection time representation 52 on the graph by continually moving it along the time axis to maintain such predetermined response time multiple 54 separation as compared to the elapsed inspection time value in position represented at the most recent incremental inspection data value and line representation 50. Maintaining the predetermined response time multiple differential between the time point representation 52 and inspection end time representation 50 on the graph 55 will occur as long as the incremental inspection data is increasing towards a maximum value.

Figure 5:
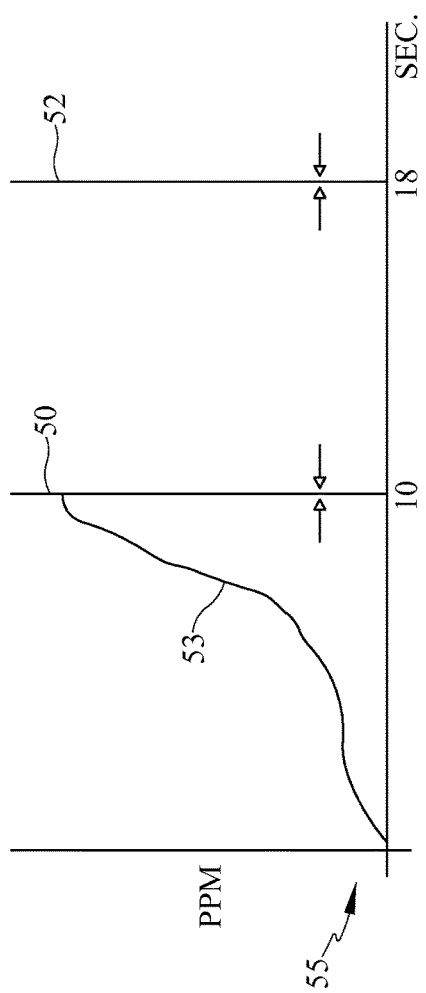
FIG. 5 illustrates a representation of an embodiment for display on the visual representation device of the incremental inspection data reaching a maximum value.
Figure 6:
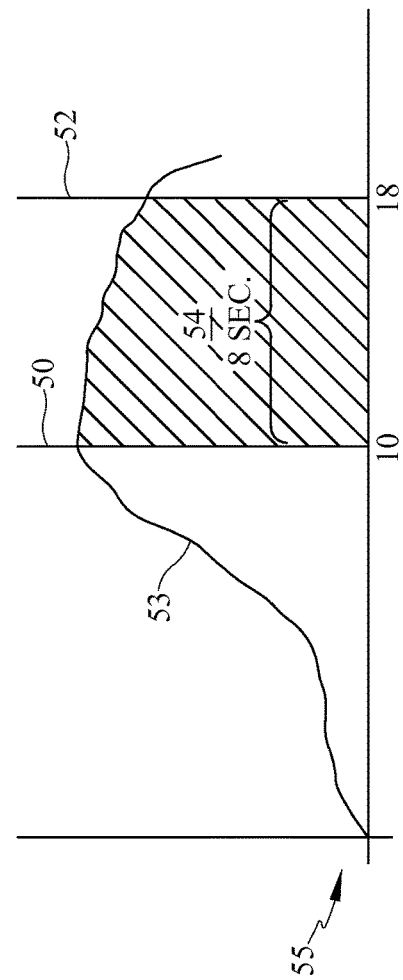
FIG. 6 illustrates a representation of an embodiment for display on the visual representation device wherein the inspection of the component has been completed and the increased inspection time results in complying with all inspection regulations.

Thus, the visual representation device will continually recalculate and determine that the incremental inspection data values are increasing as depicted in FIG. 5 and maintain the differential 54 to provide feedback to the operator as to the steadily increasing values represented on graph line 53 but also as to the increased component inspection time represented at line 52. Upon detection that the incremental inspection data has either leveled off or has begun reducing in value, the visual 'inspection end point' representation 52 on the graph 55 depicting the increased component inspection time will be maintained in a fixed position on the time graph 55 while the elapsed inspection time progresses and the data graph continues forward. Namely, upon detection of the incremental inspection data being less than or equal to the immediate prior incremental inspection data, recognition of a decreasing value and prior detection of the maximum value is accomplished. Such maximum value is represented on the incremental inspection data line 53 which will then represent a downward trend as depicted in FIG. 6. Such maximum value may also be stored in memory for later comparison. At such point as the maximum value is detected, the increased component inspection time representation 52 on the graph 55 is maintained in fixed position on the time line and the most recent incremental inspection data line 50 progresses and is representative of the elapsed inspection time value. Thus, once the elapsed inspection time equals the increased component inspection time value, the inspection is completed and all data transmitted by the TVA 20 to the visual representation device 30 is displayed on the line 53. A visual representation and the appropriate data values are maintained ensuring that the regulatory requirements of a sample at the interface where the leakage is indicated for approximately two times the instrument response time is accomplished.

The system may also provide feedback on the visual representation device that there has been a recognition of a leak in the component during the inspection or at the end of the inspection. Such determination may be made by comparing the maximum data value to a predefined leak definition value for the LDAR component. Once a determination of a leak condition exists, the visual representation device may mark the line graph or provide feedback directly to the user/operator as to the position of the leak on the inspection graph or the value at which point the leak was calculated. Further information may be provided to the operator upon determination of a leak and remedial steps may be taken or retesting of the component conducted.

The visual representation of the inspection data at graph line 53, maintenance of the most recent incremental inspection data 50 and continual movement and increasing of the component inspection time 52 and the representation thereof ensures that the operator recognize not only the maximum reading location for the component but also that the appropriate inspection time is maintained for the maximum reading location on the LDAR component. Previously, an operator would utilize the probe 21 and receive instantaneous data during the inspection time period. Such incremental inspection data was provided to the operator as a PPM reading and continually changed as the stream of data from the TVA 20 was transmitted along communication channel 22 to the communication channel 32 of any visual device whether connected or wireless. Such continued streaming of PPM readings representative of the incremental inspection data did not provide visual feedback to the operator of the actual value or location of the maximum reading during an entire inspection data line 53 and associated time position, as is presently shown. Thus, an operator when viewing such continually streamed data values must guess as to the highest value received since it is not maintained in visual recognition form and also must estimate the appropriate location of a potential leak. Further, no determination for inspection for a predetermined response time multiple at the point of the maximum reading was accomplished in order to aid the inspection process and ensure appropriate compliance.

Figure 11:
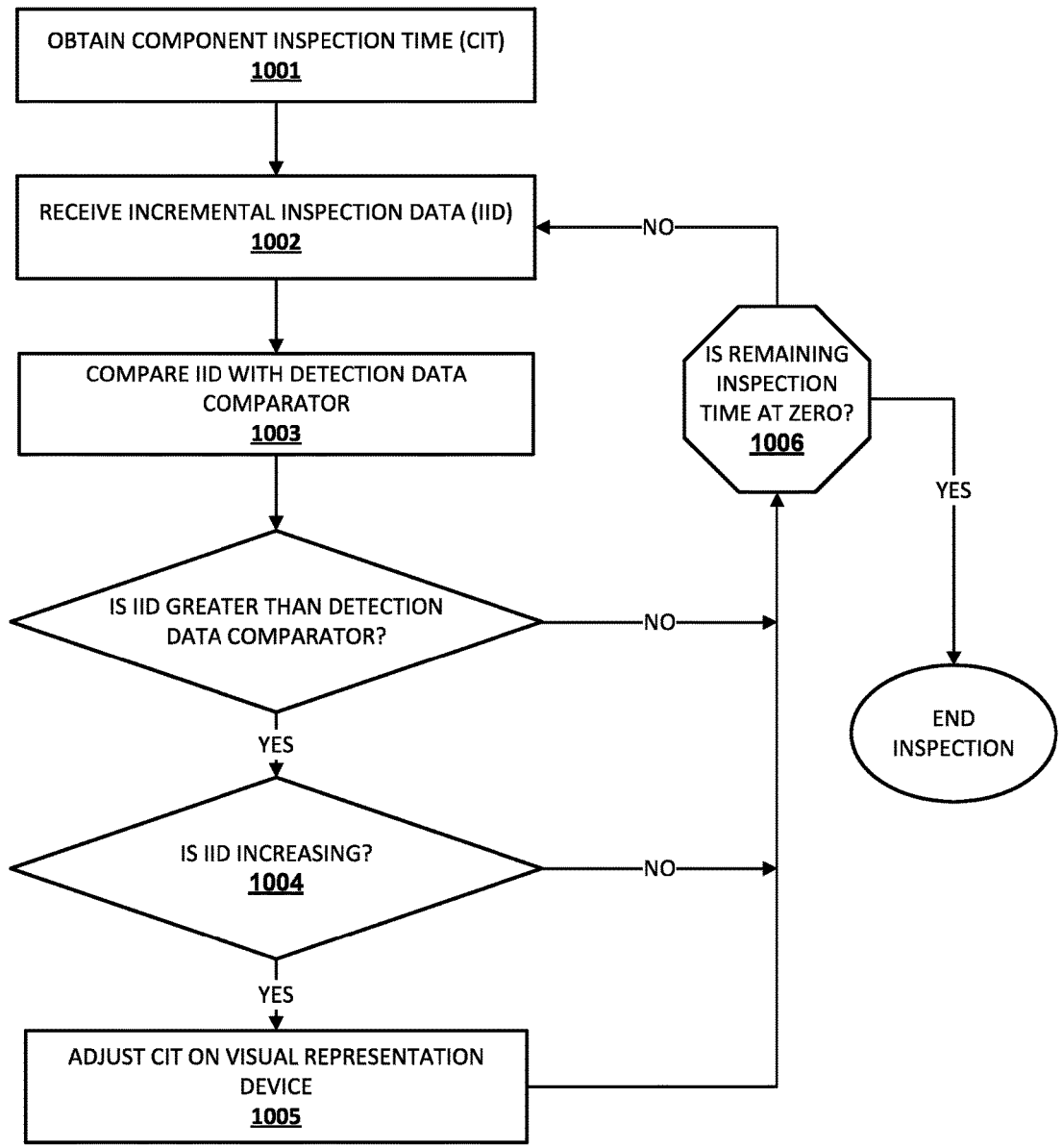
FIG. 11 is a flow chart illustrating an example method of determining monitoring time.
Figure 12A:
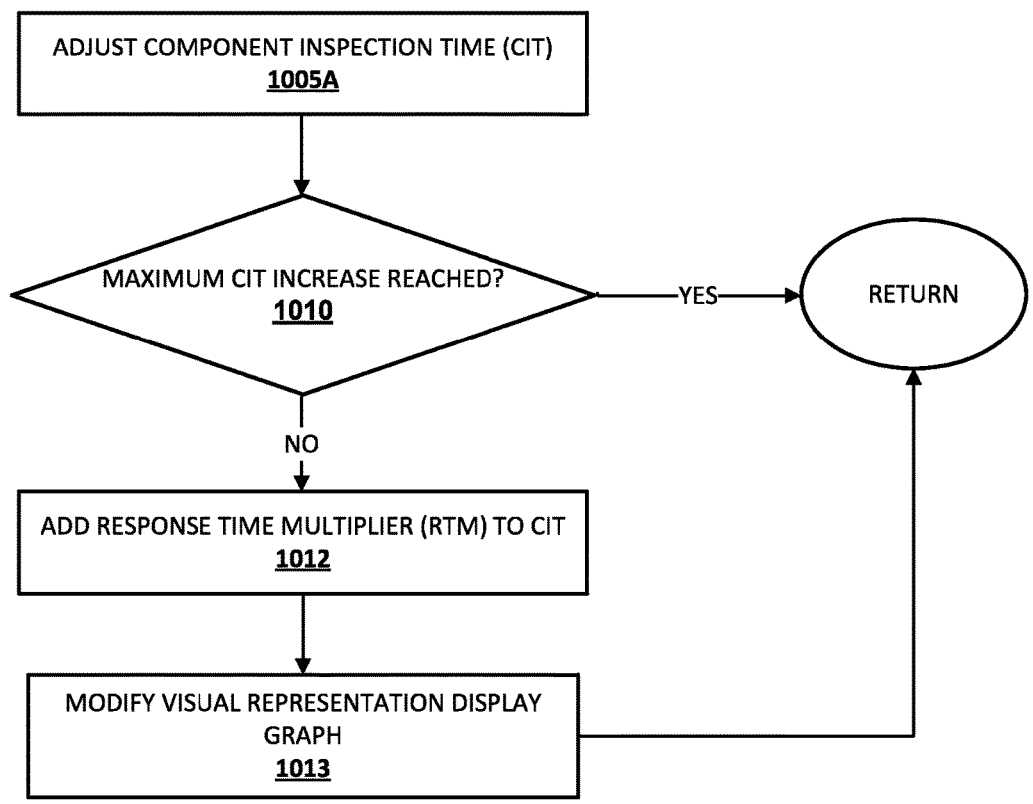
FIGS. 12A and 12B are flow charts illustrating example methods for updating the component inspection time.
Figure 12B:
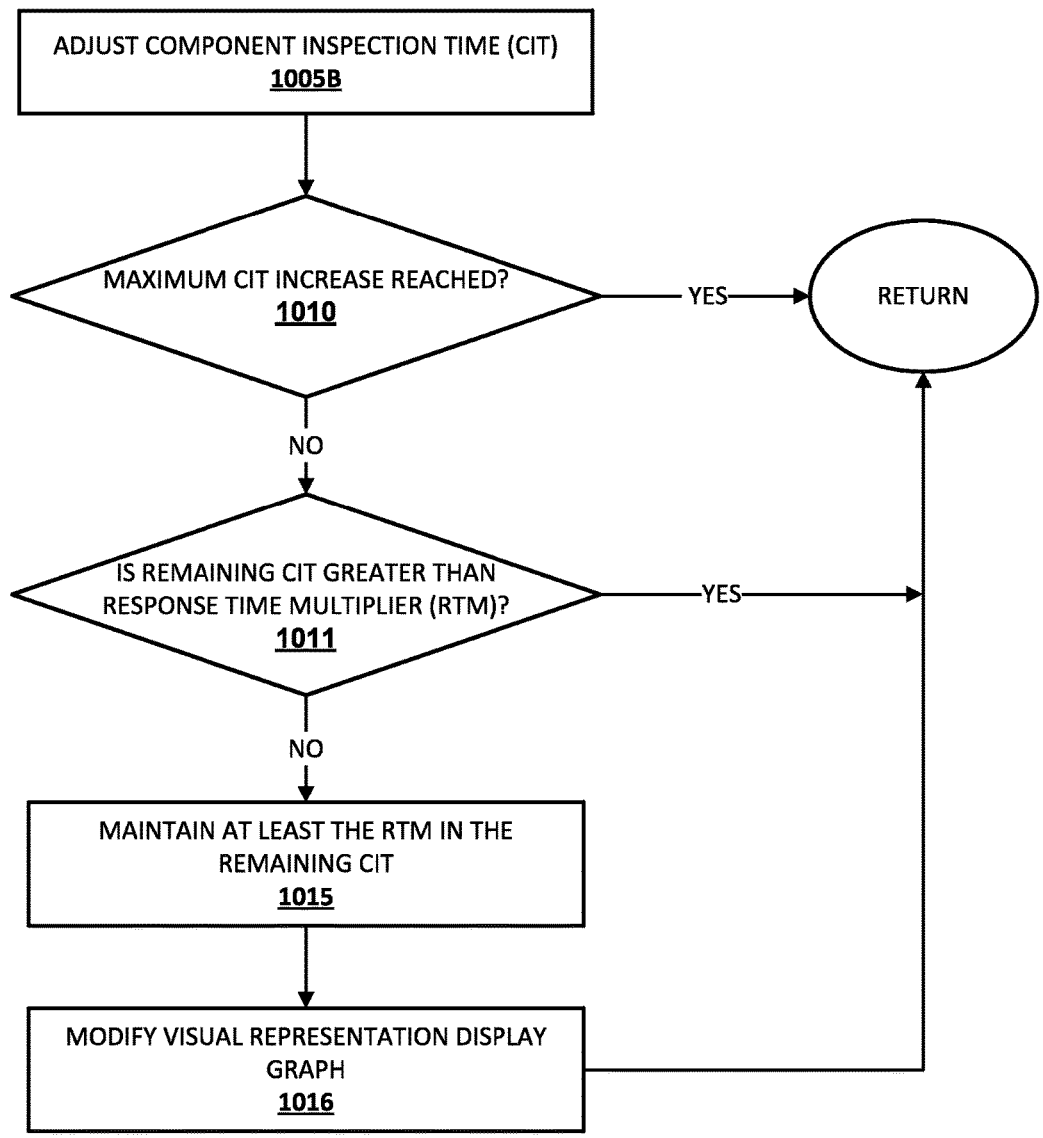

Thus, the system and method set forth herein and disclosed in the various and multiple embodiments represent visually along a graph or, as indicated herein in alternative visual representations, the actual maximum point of an incremental inspection data detection and assurances that the inspector maintained at such maximum reading point continued inspection for an additional time period of a predetermined response time multiplier. The detection of an increased reading 1004 may cause the component inspection time to be increased and may automatically incrementally increase the component inspection time while the incremental inspection data is increasing until such maximum reading occurs. Visual representation of such increased incremental inspection data on data line 53 within graph 55 is depicted within FIGS. 3-6. Determination is made as to whether increased component inspection time is necessary (1005) given the elapsed inspection time value and the required predetermined response time multiplier (1005A at FIGS. 11, 12A and 12B). At any time during the inspection, the visual representation device thus will make the determination of whether the component inspection time minus the elapsed inspection time value is less than the predetermined response time multiplier and if the incremental inspection data is increasing, then the component inspection time will be set to the elapsed inspection time value plus the predetermined response time multiplier. Such calculation ensures that a proper inspection time duration occurs during an increasing detection of the incremental inspection data. Also, the recalculation and incrementing of the component inspection time ensures that upon detection of the maximum incremental inspection data, full interrogation at the maximum read location may happen for a time period of such predetermined response time multiple. Upon such point that the incremental inspection data is not increasing, the visual representation device maintains the position of the increased component inspection time on the timeline and advances the representation for the most recent incremental inspection data position (and elapsed inspection time) 50 towards the increased component inspection time representation 52 until such time as they are equal which indicates an end to the required component inspection 1006.

Figure 7:
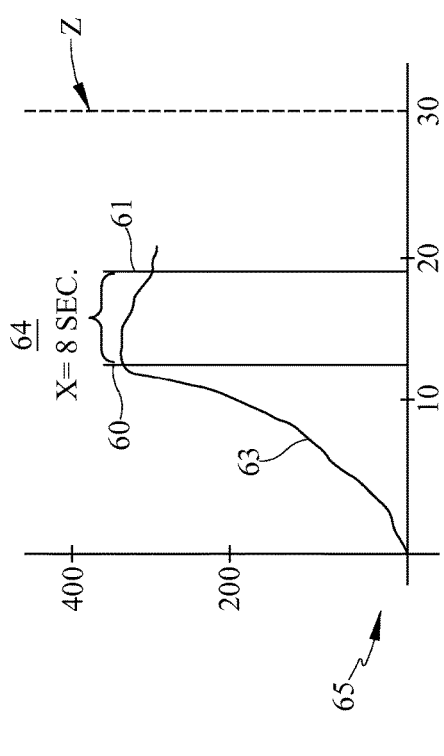
FIG. 7-9 illustrate a representation of an embodiment for display on the visual representation device wherein multiple maximum inspection values are compared.
Figure 8:
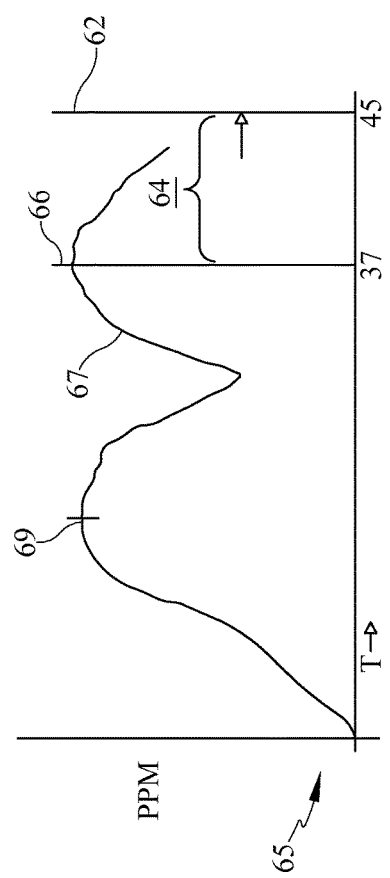
Figure 9:
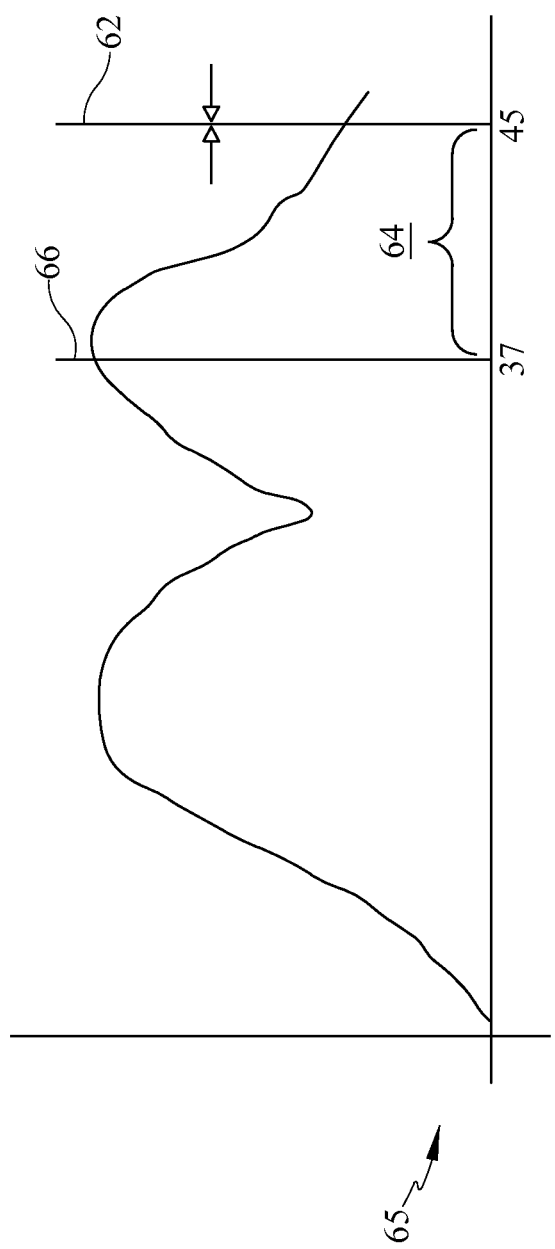

In an alternative embodiment and example, as depicted in FIGS. 7-9, a component inspection time may be represented as line Z on visual graph 65 at the beginning of an inspection. As indicated, the component inspection time for this LDAR component is initially set at 30 seconds. In this example, the incremental inspection data line 63 has advanced to a point where a maximum reading was detected at visual representation point 60. Two alternatives may be implemented. A first implementation 1005A may automatically add the predetermined response time multiplier to the component inspection time anytime an increased incremental inspection data is determined 1012. Alternatively, an optional implementation may only modify the component inspection time if there is insufficient time remaining by examining a differential between the elapsed inspection time and the component inspection time 1005B, 1011.

For example, since the total inspection time was 30 seconds and sufficient time remained in the component inspection time as compared to the elapsed inspection time value to ensure continued inspection for the predetermined response time multiple (for example, two times the response time of 4 seconds), the component inspection time representation may not be moved. The maximum read location 60 for the inspection data may be represented on the graph 65 as the inspection continues. At such maximum read value component location 60, inspection must be maintained for the predetermined response time multiple 1015. As shown, the operator obtains visual feedback 1016 during this inspection period thereby ensuring compliance with this requirement.

Initially at component location of the maximum reading 60, a second visual representation 61 may be positioned for the operator to visually indicate the time period necessary for interrogation of the maximum reading location for the predetermined response time multiple. The elapsed inspection time continues to the calculated position on the graph represented at the point of maximum reading plus the predetermined response time multiple differential 64. At timeline location 61 on the graph 65, continued inspection is required since the total component inspection time is set at timeline location Z represented by 30 total seconds. Thus, the inspector may continue the inspection along multiple interface peripheries of the LDAR component for such remaining time.

Alternatively, as noted above, an alternative embodiment includes a simple addition to the component inspection time after an increased detection in the inspection data is determined. In such embodiment, any increased reading of the incremental inspection data over the detection data comparator will consequently add a predetermined response time multiple to the component inspection time 1005A, 1012. Thus, in the depicted example of FIG. 7, upon reading an increased inspection data, the component inspection time may automatically be increased to 38 seconds and visually represented 1013. Such implementation may be readily included in the system and methods described herein.

As depicted in the embodiment shown in FIG. 8 as continued from FIG. 7, continued inspection of the LDAR component may result in a second detected increase of the incremental inspection data for the same LDAR component. Such secondary increase in detection data is represented by curve 67 and indicates a potential second position on the LDAR component where a leak may be detected. The visual representation device will automatically adjust the increased component inspection time representation 62 and advance such representation forward on the time graph 65 to maintain separation 64 of the predetermined response time multiple until such time as a maximum reading is detected at position 66. Such maximum reading is higher than the prior maximum reading marked at graph representation 69 which also results in a recalculation and repositioning of the component inspection time representation 62. Thus, in this example, an exemplary predetermined response time multiple of eight seconds is displayed as gap 64. The new maximum reading location as shown is detected at 37 seconds along representation 66. The component inspection time 62 must correspondingly be advanced and repositioned to provide an indication to the inspector as to the necessity to interrogate and inspect the interface where a second maximum reading is now detected for the required predetermined response time multiple. Once the incremental inspection data is no longer increasing and the maximum inspection value is determined, the increased component inspection time marker or line 62 is fixed in position as shown in FIG. 9 and the incremental inspection data line 63 and elapsed time 66 advances towards the increased inspection time 62 until the necessary predetermined response time multiple is met for interrogating the maximum meter reading location.

Thus, in such example, the visual representation device maintains a maximum inspection data value for the component and stores such maximum inspection data value for comparison during the entire component inspection time period. As depicted in this example, upon detection of a second increase in the incremental inspection data value at increasing graph position 67 of line graph 65, the stored maximum inspection data value is compared to determine whether or not the component inspection time must be advanced along the representative time graph 65. While the incremental inspection data is increasing, the component inspection time may be increased to assure that proper interrogation of the potential leak point is completed. In examples where multiple increases in the data are detected, variant methodologies may be implemented. Either an automatic addition to the component inspection time may occur for a limited number of sensed increased inspection values (two for example) or the component inspection time may not be increased past a hard stop calculation of the original component inspection time 1010. Such hard stop calculation for example may be two additions of the predetermined response time multiple to the original component inspection time. Such limitations may be imposed to prevent continued and repeated lengthening of the total inspection time (increased component inspection time) as increased inspection data is detected.

The method and system will thus recognize the increasing value of the incremental inspection data as it nears the component inspection time and will reposition the component inspection time value during such increasing data to allow for proper interrogation of such maximum leak point for a time value of the predetermined response time multiple.

The method and system set forth herein assures than an operator interrogating an LDAR component will maintain the probe at the location where leakage is indicated, namely the maximum meter reading location, for the predetermined response time multiple. The visual representation device may automatically determine whether the component inspection time must be adjusted in order to assure that inspection at the maximum detection location occurs for the necessary predetermined response time multiple.

In various embodiments, the incremental inspection data line 53 may be replaced with an alternative representation. In some embodiments, the incremental inspection data line may be simply numerical representations with additional numerical representations provided for the maximum incremental inspection data point, elapsed time and initial or increased component inspection time such as FIG. 10. In the various embodiments depicted and included herewith, generally, a method is provided for inspecting a leak detection and repair component. Such system and method includes initiating an inspection of the LDAR component and maintaining the elapsed inspection time for such component. During inspection of the component, various representations may be provided on a visual representation device as to the incremental inspection data received from the component inspection device.

In various embodiments, the incremental inspection data may be represented on the visual representation device along with the elapsed inspection time. As well, the visual representation device may depict in various manners a minimum component inspection time. As the elapsed inspection time progresses towards the minimum component inspection time, continued detection of the incremental inspection data may be conducted by the visual representation device. Such analysis by the visual representation device of the incremental inspection data ensures a differential between the elapsed inspection time and the component inspection time of a predetermined response time multiplier after an incremental detection of the data is determined and while such data is increasing.

Various embodiments and systems set forth herein continually reposition the component inspection time and recalculate the inspection time upon detection of an increasing value of the incremental inspection data. If the component inspection time minus the elapsed time is less than the predetermined response time multiplier, the component inspection time may be recalculated to the elapsed inspection time increased by the predetermined response time multiplier until such time that the inspection data is not increasing indicating a maximum value has been obtained.

Various embodiments and implementations may analyze the incremental inspection data and fix the component inspection time upon detection of an equal or reduced value of the incremental inspection data thus ensuring that the inspection occurs for minimum of the predetermined response time multiple at such point as the maximum incremental inspection data is achieved.

In various implementations, the representation of the incremental inspection data on the visual device is in graph form wherein the graph includes an axis of the inspection device readings and an alternative axis is the elapsed inspection time. In various other representations, the most recent or current time incremental inspection data representation may be a vertical line. Alternate representations may be utilized including colors, numerical values, height differentials on various types of graphs or other representations which indicate current positioning of data over a given time period. In other representations, maximum read values for incremental inspection data may be highlighted by utilizing a number of visual cues such as vertical line representations, colors, check marks, or other visual indicators.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The visual representation device may include or be combined separately with a computer system which may include at least one processor which communicates with a number of peripheral devices. These peripheral devices may include a storage system, including, for example, a memory system and a file storage system, user interface input devices, user interface output devices, and a network interface system. Such systems may also be integrated completely within the visual representation device. Input and output devices allow user interaction with the visual device and/or combined computer system. Network interface or communication systems provides an interface to outside networks and is coupled to corresponding interface devices in other computer systems. User interface input devices may be combined or integrated within the video display device or computer systems and include a keyboard, pointing devices such as a mouse, trackball, touchpad, or graphics tablet, a scanner, a touchscreen incorporated into the display, audio input devices such as voice recognition systems, microphones, and/or other types of input devices.

Visual representation devices may further include a display systems, such as audio output devices and other display systems. The display device and system may include a cathode ray tube (CRT), a flat-panel touch screen device or other device such as a liquid crystal display (LCD), a projection device, or some other mechanism for creating a visible image for the operator. The display device and system may also provide non-visual display such as via audio output devices. In general, use of the term "visual display device" or "visual representation device" is intended to include any possible types of devices and ways to output information from a computer based processing system to an operator either in combined structural form or in separate form. Such systems may include and incorporate all related computer hardware support, processors, memory, storage systems and instructions necessary to implement these methods.

Storage systems as disclosed may be utilized to store not only database type information but also programming and data constructs that provide the functionality of some or all of the modules described herein. For example, the storage system may include logic to perform one or more of the methods described herein such as, for example, the various methods and programming required to provide the output of the Figures or alternative output and methods.

The software used to implement the various methods and systems/processes set forth generally may be executed by processor alone or in combination with other processors. Memory used in the storage systems and on the video display or computer systems implemented herein can include a number of memories including a main random access memory (RAM) for storage of instructions and data during program execution and a read only memory (ROM) in which fixed instructions are stored. Storage and database can provide persistent storage for program and data files, and may include a hard disk drive, static drives, a floppy disk drive along with associated removable media, a CD-ROM drive, an optical drive, or removable media cartridges. Software modules implementing the functionality of certain implementations may be stored by storage system in a file storage system together or separate, or in other machines accessible by the processor(s).

What is claimed is:

1. A computer implemented method for inspecting and recording inspection of a leak detection and repair (LDAR) component on a visual representation device, comprising:
    initiating an inspection of a component, the component having a component inspection time;
    obtaining an incremental inspection data for the component, wherein obtaining the incremental inspection data for the component forms a plurality of incremental inspection data during the component inspection time;
    recording in a database a plurality of time intervals and the plurality of incremental inspection data for the component;
    representing, on a visual representation device, the incremental inspection data for the component and an elapsed inspection time value;
    determining if the incremental inspection data exceeds a detection data comparator;
    increasing the component inspection time while the incremental inspection data for the component represents an increased reading value if the absolute value of the difference between the component inspection time and the elapsed inspection time value is equal or less than a predetermined response time multiple;
    updating the elapsed inspection time value over the component inspection time;
    representing on the visual representation device, the component inspection time in addition to the elapsed inspection time value;
    maintaining the component inspection time when the incremental inspection data for the component represents a decreased reading value from a prior incremental inspection data for the component;
    ending the inspection of the component when the elapsed inspection time value meets or exceeds the component inspection time.

2. The method of claim 1 wherein the representing the plurality of incremental inspection data includes graphing the plurality of incremental inspection data for the component on a visual graph over the component inspection time.

3. The method of claim 2 wherein the representing step further includes displaying the plurality of incremental inspection data for the component as compared to the elapsed inspection time value.

4. The method of claim 3 wherein the representing step further includes displaying the component inspection time in addition to the elapsed inspection time value on the visual graph.

5. The method of claim 4 wherein the component inspection time, the elapsed inspection time and the plurality of incremental inspection data for the component are all displayed on the visual graph on the visual representation device.

6. The method of claim 5 wherein the visual graph on the visual representation device represents the plurality of incremental inspection data comparing PPM vs. Seconds.

7. The method of claim 1 wherein the representing the plurality of incremental inspection data includes displaying numeric data values.

8. The method of claim 1 wherein the plurality of incremental inspection data represents PPM readings of an LDAR inspection device.

9. The method of claim 1 wherein the detection data comparator is a background reading.

10. The method of claim 1 wherein the detection data comparator is a component specific data value.

11. The method of claim 1 wherein the step of increasing the component inspection time automatically adds the predetermined response time multiple to the component inspection time upon a first instance of the incremental inspection data for the component exceeding the detection data comparator.

12. The method of claim 1 wherein the elapsed inspection time value is a value in time incremental seconds.

13. The method of claim 1 wherein the recording at a plurality of time intervals and the plurality of incremental inspection data for the component further includes recording an associated time entry for each of the plurality of inspection data for the component.

14. The method of claim 13 wherein the associated time entry is the elapsed inspection time value.

15. The method of claim 2 further including representing on the visual representation device a visual marker at a maximum incremental inspection data for the component.

16. The method of claim 2 further including representing on the visual representation device the component inspection time.

17. The method of claim 2 wherein the visual representation device is remote from an LDAR component inspection device and includes a wireless communication device to communicate with the LDAR component inspection device.

18. The method of claim 17 wherein the visual representation device includes memory storage to maintain the database.

19. The method of claim 18 wherein the visual representation device includes a remote connection to a remove server, the remote server maintaining a master inspection database which is updated with data from the database of the visual representation device.

20. The method of claim 2 wherein the visual graph includes a line graph.

21. The method of claim 20 wherein the line graph includes a linear moving representation over time of the incremental inspection data for the component.

22. The method of claim 21 wherein the line graph includes a first representation of a maximum value of the plurality of incremental inspection data.

23. The method of claim 22 wherein the line graph includes a second representation of the component inspection time.

24. The method of claim 23 wherein first representation and the second representation are maintained at least a predetermined distance apart on the visual graph.

25. The method of claim 24 wherein the predetermined distance apart is a time period.

26. The method of claim 25 wherein the time period is fixed time period related to an LDAR inspection device which is in communication with the visual representation device.

27. The method of claim 2 wherein the elapsed inspection time value and the component inspection time are a data point on the visual graph.

28. The method of claim 1 wherein the elapsed inspection time value and the component inspection time are a displayed numerical representation.

29. The method of claim 1 wherein the component inspection time is initially a predefined value related to the LDAR component.

30. A computer implemented method for inspecting and recording inspection of a leak detection and repair (LDAR) component on a visual representation device, comprising:
   starting inspection of a component;
   reading remotely inspection data values from an LDAR inspection device;
   displaying the inspection data values on a display device;
   displaying a component inspection time on the display device;
   relating the inspection data values on the display device and the component inspection time on the display device in graph form;
   continually increasing the component inspection time on the graph form on the display device while detecting an increased reading value in the inspection data values;
   maintaining on the graph form on the display device the increased component inspection time at a point on the graph when the inspection data values begin to decrease.

31. A computer implemented method for inspecting a leak detection and repair component, comprising:
   starting an inspection of an LDAR component;
   representing on a visual device an incremental inspection data;
   representing on the visual device an elapsed inspection time;
   placing the incremental inspection data and elapsed inspection time on a graph;
   placing a minimum component inspection time point on the graph;
   continually increasing and repositioning the minimum component inspection time point on the graph during detection of an increasing value of the incremental inspection data;
   fixating the minimum component inspection time point on the graph upon detection of an equal or reduced value of the incremental inspection data.

32. A system including memory and one or more processors operable to execute instructions stored in the memory, comprising instructions to:
   start an inspection of an LDAR component;
   read inspection data values from an LDAR inspection device;
   display a component inspection time on a display device;
   display the inspection data values on a graph form on the display device;
   relate the inspection data values on the display device and the component inspection time on the display device in the graph form;
   increase the component inspection time to an increased component inspection time on the graph form on the display device while detecting an increased reading value in the inspection data values;
   maintain on the graph form on the display device the increased component inspection time at a point on the graph when the inspection data values begin to decrease.

33. A system including memory and one or more processors operable to execute instructions stored in the memory, comprising instructions to:
   start an inspection of an LDAR component;
   determine a response time multiple;
   read a plurality of incremental inspection data values from an LDAR inspection device;
   display a component inspection time on a display device on a graph form;
   display the incremental inspection data values on the graph form in combination with a representation of an elapsed inspection time value position on the graph form;

calculate a remaining inspection time value;
increase the component inspection time to an increased component inspection time on the graph form on the display device while detecting an increased reading value in the incremental inspection data value and when the response time multiple is greater than the remaining inspection time value;
maintain on the graph form on the display device the increased component inspection time at a point on the graph when a current inspection data value is less than an immediately prior inspection data value thereby indicating that the incremental inspection data values are decreasing.

* * * * *